United States Patent [19]
Shutic et al.

[11] Patent Number: 5,275,659
[45] Date of Patent: Jan. 4, 1994

[54] COATING APPARATUS HAVING A DISPENSER HOUSING

[75] Inventors: Jeffrey R. Shutic, Wakeman; Robert J. Holland, Avon; John F. Carlson, Sheffield Village, all of Ohio

[73] Assignee: Nordson Corporation, Westlake, Ohio

[21] Appl. No.: 959,993

[22] Filed: Oct. 13, 1992

Related U.S. Application Data

[63] Continuation of Ser. No. 594,320, Oct. 9, 1990, abandoned.

[51] Int. Cl.$^5$ ............................................. B05B 5/00
[52] U.S. Cl. ................................. 118/315; 118/323; 239/690; 239/704
[58] Field of Search ............... 118/621, 624, 625, 629, 118/631, 634, 64, 308, 309, 314, 315, 323, 326, DIG.; 239/418, 423, 424, 424.5, 566, 690, 704, DIG.

[56] References Cited

U.S. PATENT DOCUMENTS

| | | | |
|---|---|---|---|
| 2,979,273 | 12/1958 | Liebhart | 239/550 |
| 3,940,061 | 2/1976 | Gimple et al. | 239/15 |
| 4,630,777 | 12/1986 | Hollstein et al. | 239/3 |
| 4,784,331 | 11/1988 | Sharpless et al. | 118/626 |
| 4,977,000 | 12/1990 | Murayama et al. | 118/323 |
| 5,092,307 | 3/1992 | Behr et al. | 118/315 |

FOREIGN PATENT DOCUMENTS 475120  6/1973  Australia .

Primary Examiner—W. Gary Jones
Assistant Examiner—Dean T. Nguyen
Attorney, Agent, or Firm—Wood, Herron & Evans

[57] ABSTRACT

An apparatus for mounting and moving coating dispensers within the interior of a spray booth, and particularly the coating dispensers located above an object moving through the booth, comprises a dispenser housing having an aerodynamically shaped outer surface formed with a leading edge, a trailing edge and opposed generally curved sides. A pair of support assemblies isolated from the booth interior mount the dispenser housing in the path of a downward flow of air within the booth interior within which oversprayed coating material is entrained for collection such that the leading edge of the dispenser housing faces the top or ceiling of the spray booth and its trailing edge faces the objects moving through the booth. One or more coating dispensers are mounted at the trailing edge of the dispenser housing in a position to discharge powder coating material downwardly onto the object, such as the hood, roof and trunk of a vehicle body. Each support assembly carries one side of the dispenser housing and structure is provided on at least one of the support assemblies for moving the dispenser housing vertically, side-to-side and pivotally with respect to objects moving through the booth.

7 Claims, 4 Drawing Sheets

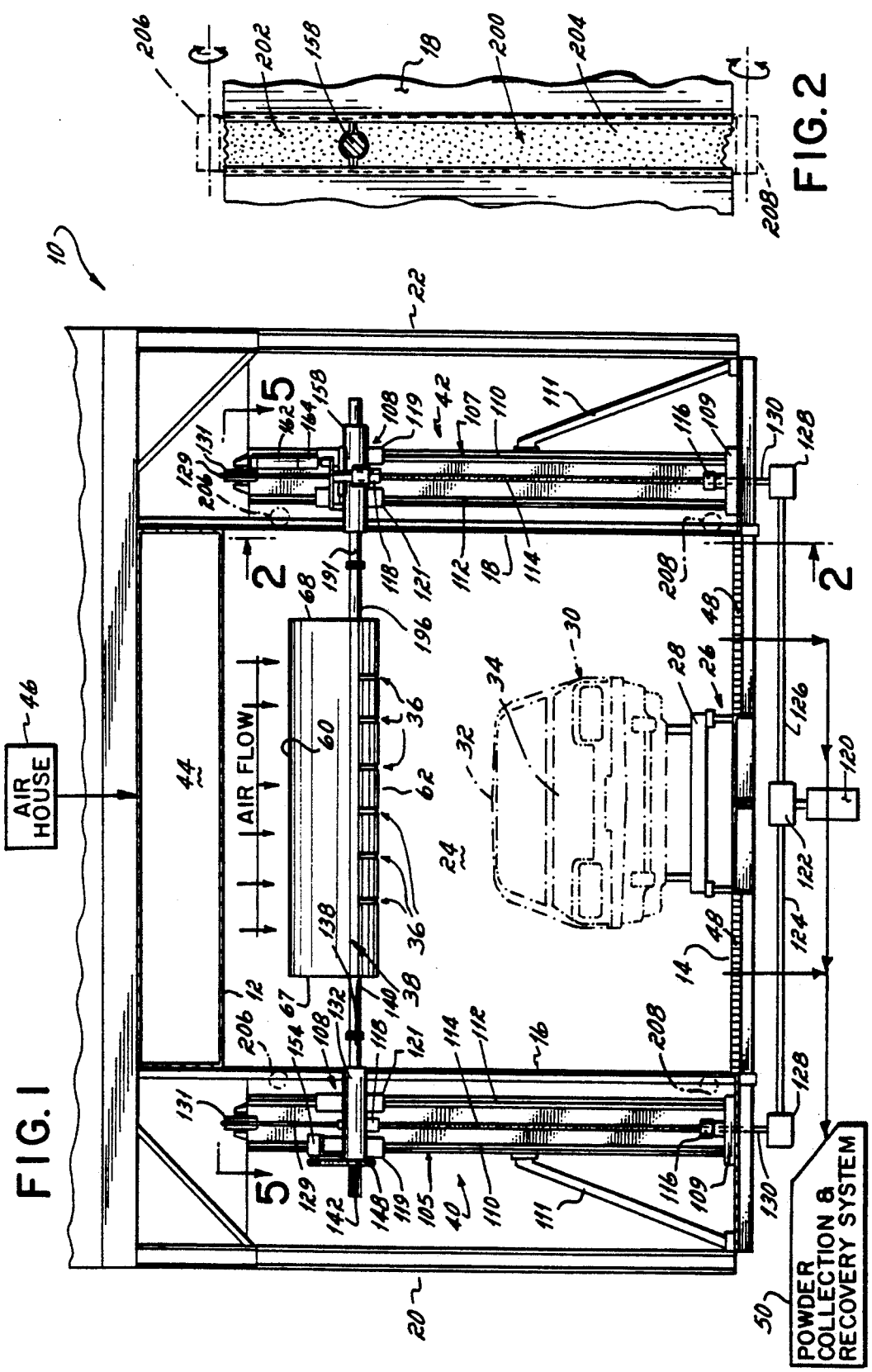

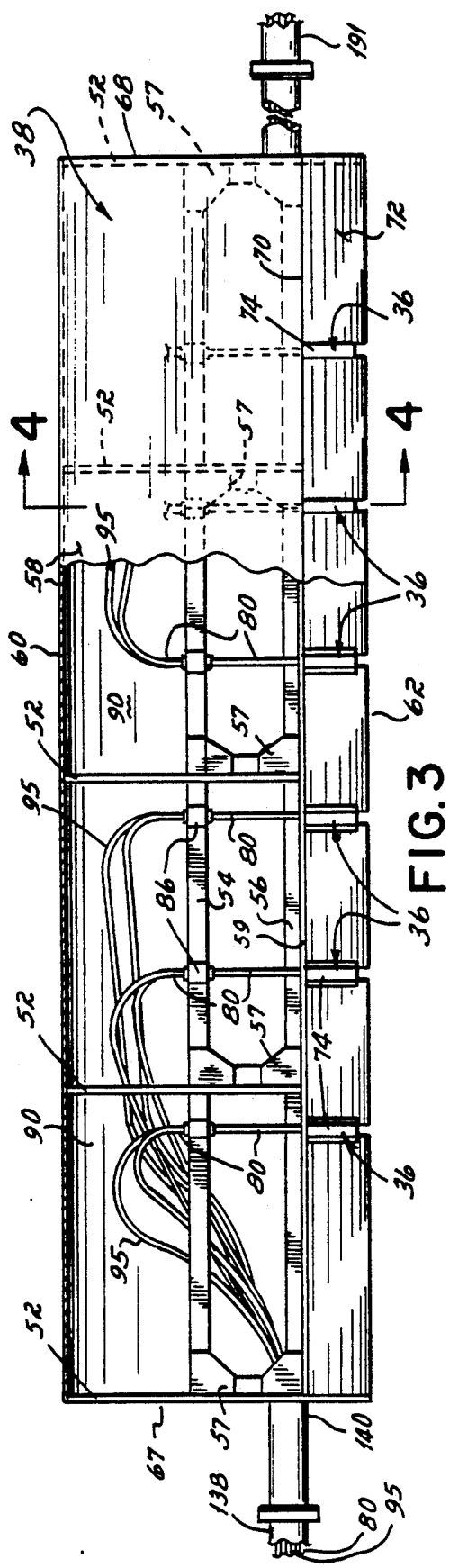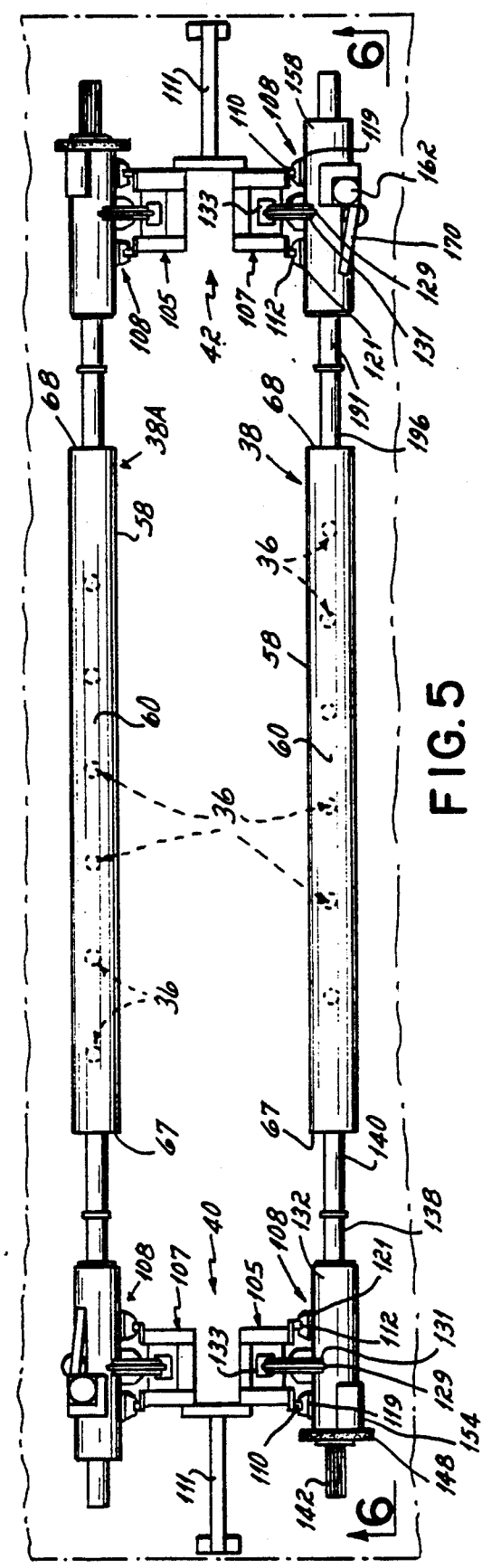

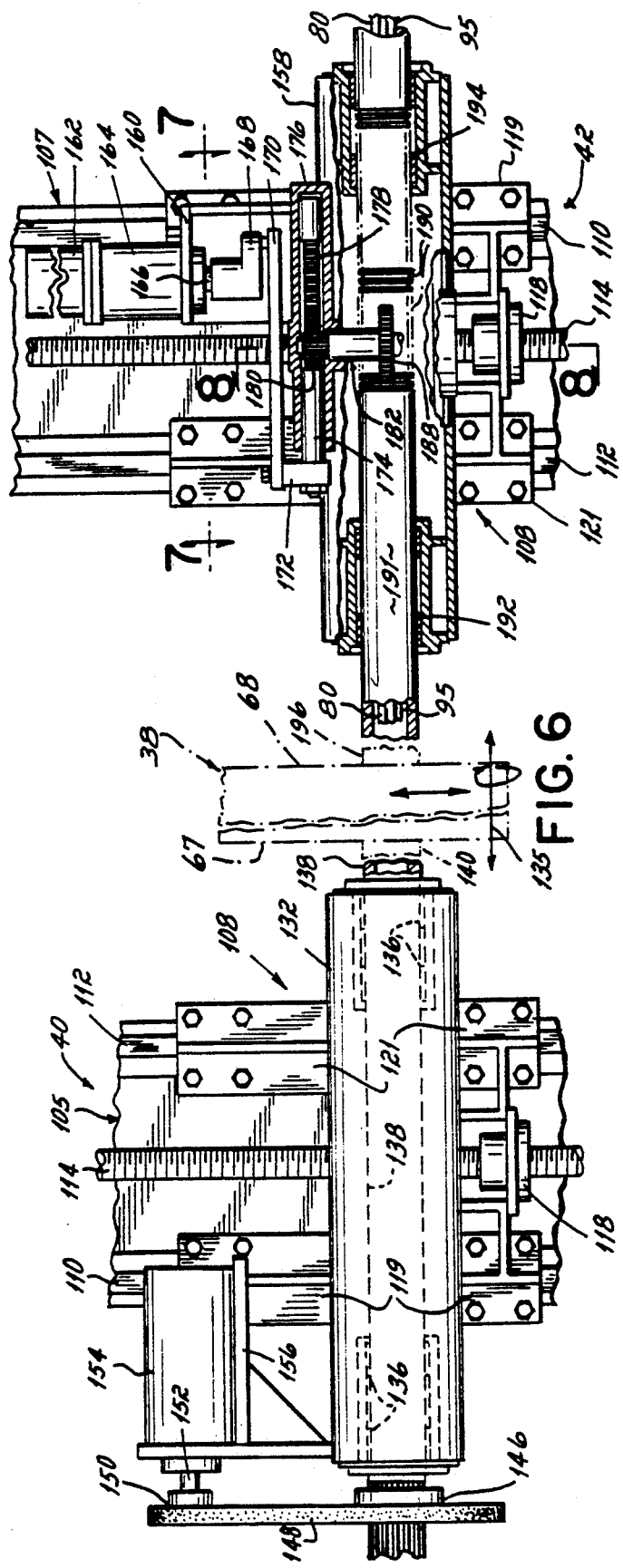
FIG. 6
FIG. 7
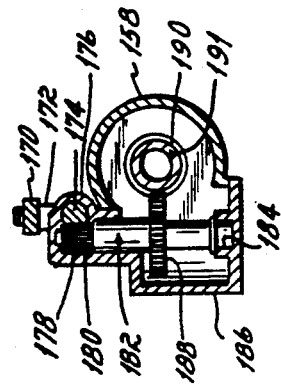
FIG. 8

COATING APPARATUS HAVING A DISPENSER HOUSING

This is a continuation, of application Ser. No. 07/594,320, filed Oct. 9, 1990, now abandoned.

FIELD OF THE INVENTION

This invention relates to systems for dispensing coating material, and, more particularly, to an apparatus for mounting and moving coating dispensers within the interior of a spray booth while minimizing air turbulence and contamination within the booth.

BACKGROUND OF THE INVENTION

The application of coating materials to objects has conventionally been accomplished in spray booths having an elongated tunnel-like construction formed with an inlet for the ingress of the object, a coating application area, a curing or drying area in some designs and an outlet for the egress of the object. In some systems, "conditioned" air, i.e., humidified and filtered air, is introduced by a blower or feed fan into a plenum chamber at the top of the spray booth, and directed downwardly toward the floor of the booth. Alternatively, negative pressure is created within the booth interior which draws ambient air downwardly from the top of the booth to the floor. In either design, oversprayed coating material is entrained within this downward flow of air in the booth interior and delivered to a powder collection and recovery system at the base or sides of the booth where filters capture the oversprayed coating material and exhaust filtered or clean air to the atmosphere or back to the system for reuse.

In coating large objects such as vehicle bodies, both vertically and horizontally oriented surfaces must be coated as the object moves through the booth interior. For example, the fenders and doors of a vehicle body travel vertically through the spray booth, while the hood, roof and trunk areas of the vehicle body are oriented horizontally in the course of movement through the booth. In order to obtain a uniform coating on all of these surfaces, it has been the practice to provide one or more coating dispensers at the side walls of the spray booth to coat the vertically oriented surfaces of the vehicle body, and to mount one or more coating dispensers overhead near the top of the booth to dispense coating material downwardly onto the roof, hood and trunk areas of the vehicle body. Depending upon the size of the vehicle body, the number and location of coating dispensers utilized and a variety of other factors, mounting structure is needed to move both the side and overhead coating dispensers relative to the vehicle body in order to obtain the desired film build-up on all surfaces. In many instances, deposition of the coating material on the object is further enhanced by electrostatically charging the coating material as it is discharged from the dispensers and maintaining the vehicle bodies or other objects to be coated at a different or ground potential so that the charged coating material is electrostatically attracted to the objects.

One problem associated with the structure commonly employed for moving coating dispensers within the interior of spray booths involves the potential for contamination of the coating material as it is applied to the vehicle body or other object within the booth. In the past, the mechanisms for moving the side mounted and overhead mounted coating dispensers have been exposed within the spray booth interior. This can create contamination of the coating material as it contacts the lubricated connections and drive structures associated with the dispenser moving devices. Additionally, the lines which supply coating material to the dispensers, and, in some designs, the lines which carry high voltage electrostatic cables to the dispensers, are also commonly exposed within the interior of the booth. In powder applications, these utility lines can create further contamination of the coating material by abrasion and fall-out of non-atomized powder onto the substrate.

Another problem with devices currently utilized to move coating dispensers involves the creation of air turbulence within the booth interior. Turbulence is of particular concern when powder coating material is utilized as a replacement for high solids, liquid paint material. Powdered resin coating material has a much lower density and is much lighter in weight than atomized liquid paint particles, and is discharged from a dispenser in a cloud-like pattern onto the object to be coated. It has been found that in applying low density, lightweight powder material onto a vehicle body, and particularly its horizontal surfaces such as the hood, roof and trunk, systems for moving the coating dispensers up and down, side-to-side and/or pivotally with respect to such surfaces can result in the creation of turbulence within the booth interior. That is, the downward flow of air within the booth interior which entrains oversprayed coating material becomes turbulent as the overhead coating dispensers are moved with respect to the object to be coated. This turbulence can create an inconsistent film build-up on the object because it disrupts the flow of powder material between the coating dispensers and the object to be coated.

SUMMARY OF THE INVENTION

It is therefore among the objectives of this invention to provide structure for moving coating dispensers within the interior of a spray booth which avoids contamination of the booth interior and which minimizes air turbulence within the booth interior as the coating dispensers are moved with respect to an object passing through the booth.

These objectives are accomplished in an apparatus for moving coating dispensers within the interior of a spray booth, and particularly the coating dispensers located above an object moving through the booth, which comprises a dispenser housing having an aerodynamically shaped outer surface formed with a leading edge, a trailing edge and opposed generally curved sides. A pair of support assemblies isolated from the booth interior mount the dispenser housing in a position such that its leading edge faces the top or ceiling of the spray booth and its trailing edge faces the objects moving through the booth. One or more coating dispensers are mounted at the trailing edge of the dispenser housing in a position to discharge powder coating material downwardly onto the object, such as the hood, roof and trunk of a vehicle body. Each support assembly carries one side of the dispenser housing and structure is provided on at least one of the support assemblies for moving the dispenser housing vertically, side-to-side and pivotally with respect to objects moving through the booth.

An important aspect of this invention is predicated upon the concept of providing a dispenser housing having an aerodynamically shaped outer surface which reduces turbulence within the booth interior. In the presently preferred embodiment, the outer surface of the dispenser housing is formed in the general shape of an air foil wherein the leading edge has a smoothly curved shape, the trailing edge tapers inwardly in a generally triangular shape, and the sides are generally curved from the leading edge toward the trailing edge. This aerodynamic shape creates a substantially laminar flow of the air moving therepast. Such laminar flow conditions in the area of the dispenser housing ensure that a minimum of turbulence is created between the coating dispensers at the trailing edge of the dispenser housing and the objects moving through the booth beneath the dispensers. Because powder coating material has such a low density and light weight, minimization of air turbulence within the booth interior is important to obtain a consistent film build-up on the horizontal surfaces of the objects to be coated.

Another important aspect of this invention is that the utility lines associated with the coating dispensers are completely contained within the interior of the dispenser housing. In the presently preferred embodiment, the supply lines which feed powder coating material to the coating dispensers and the lines which carry high voltage electrostatic cables to charging electrodes associated with each coating dispenser, are all located inside of the dispenser housing and are isolated from the booth interior. Additionally, such utility lines are fed to the dispenser housing through hollow support tubes connected between each support assembly and an end of the dispenser housing which further isolates the utility lines from the booth interior. This avoids contamination of the coating material discharged from the coating dispensers.

Contamination of coating material within the booth interior by the structure for moving the dispenser housing is also eliminated in this invention. Each support assembly is located within a space formed between an inner wall of the spray booth and an outer wall thereof. The objects to be coated are moved through the area between the inner walls of the booth for coating, and the column supports are isolated from this coating area or spraying chamber except for the support tubes extending therefrom to one side of the dispenser housing. Preferably, a movable seal is formed between these support tubes and the inner walls of the booth to permit vertical movement of the dispenser housing within the booth interior while sealing the support assemblies from the spraying chamber.

In the presently preferred embodiment, each of the support assemblies on opposite sides of the spray booth includes at least one vertical column which mounts a carriage having linear ways which mount a carriage movable vertically therealong. Each carriage mounts one of the support tubes which are connected to an end of the dispenser housing. The carriage on each vertical column is effective to move the dispenser housing vertically with respect to objects within the booth, and additional structure is provided on the carriage associated with at least one of the vertical columns to move the dispenser housing side-to-side, i.e., along a transverse axis perpendicular to the movement of the objects to the booth, and to pivot the dispenser housing about the transverse axis. Such vertical, side-to-side and pivotal motion of the dispenser housing is effective to position the coating dispensers at the desired location with respect to objects moving through the booth to obtain the desired film build-up on all horizontally oriented surfaces. In one presently preferred embodiment, each support assembly includes two vertical columns so that two dispenser housings can be provided within the spraying chamber of the booth, and it is contemplated that essentially any number of support assemblies could be employed in a booth of given dimensions depending upon the requirements of a particular application.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 1 is a partial elevational view of one end of the spray booth incorporating the dispenser moving apparatus of this invention;

FIG. 2 is a side view of an interior wall of the spray booth taken generally along line 2—2 of FIG. 1;

FIG. 3 is a partially broken away, elevational view of one of the dispenser housings of this invention;

FIG. 5 is a view taken generally along line 5—5 of FIG. 1;

FIG. 6 is a schematic, partially broken away view taken generally along line 6—6 of FIG. 5;

FIG. 7 is a cross sectional view taken generally along line 7—7 of FIG. 6; and

FIG. 8 is a cross sectional view taken generally along line 8—8 of FIG. 6.

DETAILED DESCRIPTION OF THE INVENTION

Figure 4:
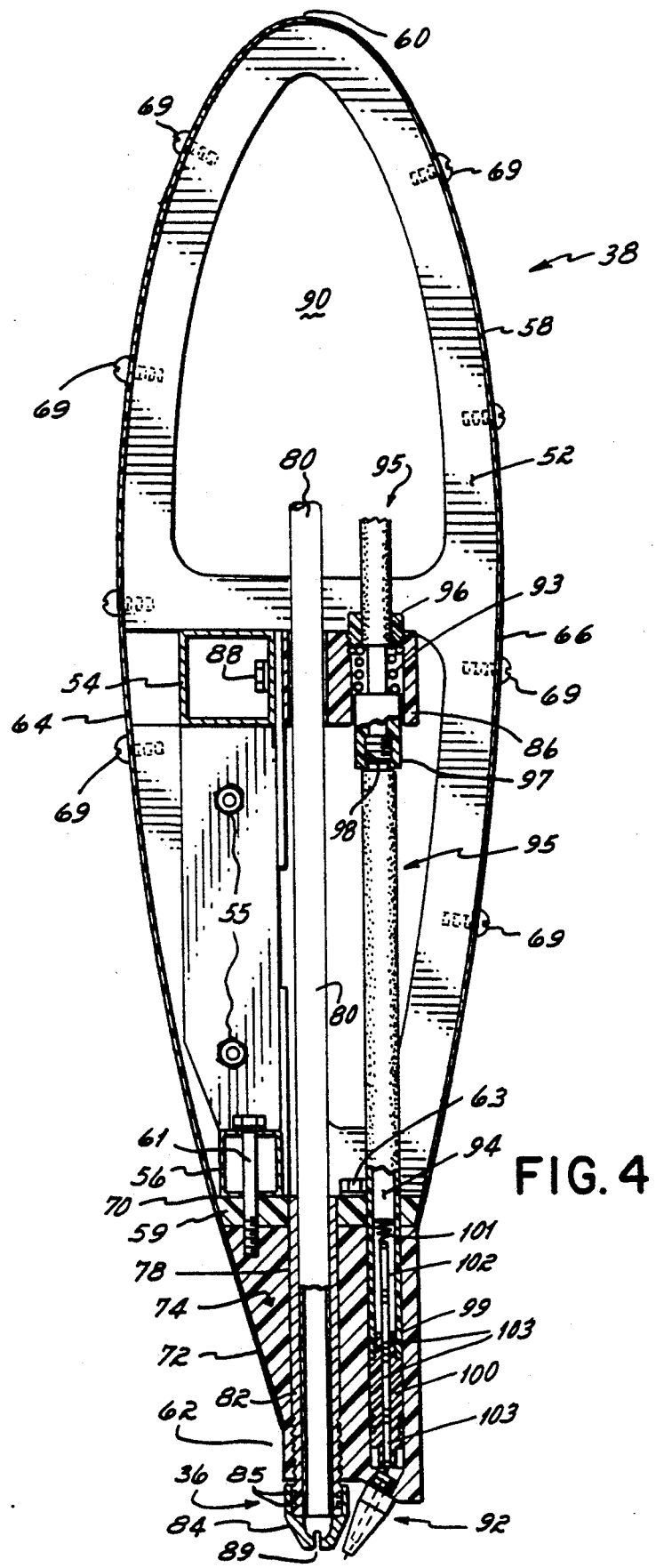
FIG. 4 is a cross sectional view of the dispenser housing herein taken generally along line 4—4 of FIG. 3.

With reference to FIG. 1, a powder spray booth 10 is illustrated which comprises a ceiling 12, floor 14, opposed inner side walls 16, 18, and opposed outer side walls 20, 22. A spraying chamber 24 is formed between the inner side walls 16, 18, floor 14 and ceiling 12 which defines a controlled area within which to apply powder coating material onto objects as described in detail below. In the embodiment illustrated in FIG. 1, a carrier 28 located atop a conveyor 26 supports a vehicle body 30 for movement through the spraying chamber 24 of booth 10.

As described in more detail below, the subject matter of this invention is particularly directed to applying powder coating material onto the generally horizontally oriented surfaces of the vehicle body 30 including the roof 32, trunk 34 and hood (not shown). The powder material is dispensed from a number of dispensers 36 carried in dispenser housings 38 and 38A described in detail below. Each dispenser housing 38, 38A is mounted within the spraying chamber 24 overhead or above the horizontal surfaces of the vehicle body 30. A pair of support assemblies 40 and 42, the structure and operation of which is described in detail below, position each dispenser housing 38, 38A within the spraying chamber 24. In the embodiment of spray booth 10 illustrated in FIG. 1, a flow of "conditioned" air, i.e., filtered and tempered air, is directed downwardly toward the base of the booth 10 from a plenum 44 mounted at the ceiling 12. The conditioned air is supplied to the plenum 44 from an air house 46 illustrated schematically in FIG. 1. In the course of movement from the plenum 44 toward the booth floor 14, the conditioned air picks up or entrains oversprayed powder material which has been discharged from the dispensers 36, but does not adhere to the vehicle body 30. The air-entrained powder material is drawn through gratings 48 at the floor 14 of the booth 10 into a powder collection and recovery system 50 located beneath the floor 14.

The detailed construction of the booth 10, including the air house 46 and powder collection and recovery system 50, form no part of this invention per se and are thus not described herein. Reference should be made to U.S. patent application Ser. No. 07/510,295, filed Apr. 16, 1990, and entitled "Powder Coating System" for a detailed discussion of same, the disclosure of which is incorporated by reference in its entirety herein.

DISPENSER HOUSING

Referring now to FIGS. 3 and 4, the construction of the dispenser housing 38 is illustrated in detail, it being understood that the structure and operation of dispenser housing 38A is identical. In the presently preferred embodiment, the dispenser housing 38 comprises an internal frame structure including a series of longitudinally spaced, vertically oriented posts or ribs 52 connected between a longitudinally extending upper spar 54 and a parallel, lower spar 56. The spars 54, 56 are interconnected at longitudinally spaced intervals by brackets 57 fixedly mounted thereto, and each of these brackets 57 mount one of the ribs 52 such as by bolts 55 or other suitable fasteners. A plate 59 is mounted to the lower spar 56 by bolts 61. The frame structure supports an aerodynamically shaped outer surface or skin 58, preferably formed of a non-conductive material, defining a leading edge 60, a trailing edge 62, opposed sides 64 and 66 extending between the edges 60, 62 and opposed ends 67 and 68. The outer skin 58 is attached to the posts 52 by screws 69 or other suitable fasteners.

With reference to FIG. 4, the "aerodynamic shape" of the outer skin 58 of dispenser housing 38 resembles an air foil, such as an airplane wing. The leading edge 60 has a generally arcuate shape, the trailing edge 62 tapers inwardly and each of the sides 64, 66 are curved in a generally convex shape along at least a portion of their length. In the presently preferred embodiment, each of the sides 64, 66 has a radially outwardly curved shape from the leading edge 60 of the outer skin 58 to approximately the upper spar 54, and a radially inwardly curved shape from the upper spar 54 to a location 70 near the lower spar 56. Preferably, each side 64 and 66 has a straight portion 72 extending from the location 70 to the lowermost portion of the trailing edge 62, forming a generally triangular-shaped area at the lower portion of dispenser housing 38.

A number of longitudinally spaced, dispenser bodies 74 are mounted to plate 59 at the lower, triangular-shaped portion of the dispenser housing 38 by the bolts 61 and 63. See FIG. 4. Each dispenser body 74 is formed with a bore 78 which receives a powder supply tube 80. The lowermost end of the powder supply tube 80 is affixed within the bore 78 by a non-conductive nozzle adaptor 82 which is threaded into the base of bore 78. The nozzle adaptor 82 has an outwardly extending end which- mounts a powder spray nozzle 84 secured thereto by O-rings 85. The lower end of the powder supply tube is spaced from the nozzle a sufficient distance, so as not to effect the electrostatic charging of the powder. A The upper end of the powder supply tube 80 is carried within a bore formed in a mounting block 86 fixed by one or more bolts 88 to the upper spar 54. As described in more detail below, the powder supply tube 80 for each dispenser 36 is carried within a service cavity 90 extending along the length of the dispenser housing 38, and then through mounting structure (to be described) associated with the support assemblies 40 or 42 to a location outside of the spray booth 10. In this manner, the powder supply tube 80 is completely isolated from the spraying chamber 24 of booth 10.

In the presently preferred embodiment, the powder material is electrostatically charged prior to application onto the vehicle body 30 which enhances deposition of the powder material thereon. In order to impart an electrostatic charge to powder material dispensed from the nozzle 84, an electrode assembly 92 is mounted at the base of dispenser body 74 in a position proximate the discharge outlet 89 of nozzle 84. A high voltage electrostatic charge is transmitted to the electrode assembly 92 by an electrostatic cable 94 carried within a dielectric tube 95 which extends through the service cavity 90 of dispenser housing 38 to the mounting block 86 where it is mounted by a retainer 96. The dielectric tube 95 is separated at the mounting block 86 forming an upper end carried by the retainer 96, and a lower end which abuts a sleeve 97 slidably received within the mounting block 86. This sleeve 97 has internal threads 98 fixedly attached to the electrostatic cable 94 within the dielectric tube 95. The dielectric tube 95 extends downwardly from the sleeve 97, as viewed in FIG. 4, into a bore 99 formed in dispenser body 74 where it is threadedly connected to a dielectric block 100 which is also carried within bore 99.

In the presently preferred embodiment, a coil spring 93 extends between the fixed retainer 96 and movable sleeve 97 to urge the electrostatic cable 94 downwardly as viewed in FIG. 4 toward the dispenser body 74. A spring 101 mounted at the lowermost end of electrostatic cable 94 is thus forced into electrical contact with a resistor 102 carried within the lower-most portion of the dielectric tube 95. This resistor 102 is in contact with other resistors 103 which are carried end-to-end and potted within the dielectric block 100 thus forming a completed electrical path to the electrode assembly 92. Preferably, a dielectric material such as grease is provided within the dielectric tube to encase the resistor 102 and/or resistors 103 to reduce the possibility of a corona discharge within the dispenser body 74.

Each dispenser 36 is effective to discharge a pattern of electrostatically charged powder material from the trailing edge 62 of dispenser housing 38 downwardly toward the horizontally extending surfaces of the vehicle body 30. In the presently preferred embodiment of the invention illustrated in the FIGS., and as best shown in FIG. 5, the two dispenser housings 38 and 38A are spaced from one another in the direction of movement of a vehicle body 30 through booth 10, and each carry a number of dispensers 36. Preferably, the dispensers 36 mounted to the first dispenser housing 38 are longitudinally offset from the dispensers 36 carried on the second dispenser housing 38A to ensure the spray pattern collectively obtained from the dispensers 36 on both housings 38, 38A completely covers all of the horizontal surfaces of the vehicle body 30.

An important advantage of the construction of dispenser housings 38 and 38A is that the powder supply tube 80 and dielectric tube 95 are completely confined within the interior of the dispenser housings 38, 38A to avoid any contamination of the environment within the spraying chamber 24 of the booth 10. As mentioned above, a separate powder supply tube 80 and dielectric tube 95 for each dispenser 36 is fed through mounting structure associated with the support assemblies 40, 42, as described below, into the service cavity 90 of the dispenser housing 38. No part of either the powder supply tube 80 or dielectric tube 95 is exposed within the spraying chamber 24.

DISPENSER HOUSING MOVEMENT

Referring now to FIGS. 1, 2 and 5-7, the structure for moving the dispenser housings 38, 38A, and, in turn, dispensers 36, is illustrated in detail. Because the horizontally oriented surfaces of the vehicle body 30 are at different vertical heights on the vehicle, and may have curved or other non-linear surfaces, it is desirable to provide for manipulation of the dispenser housings 38 and 38A so that the dispensers 36 carried thereon can be maintained at the desired elevation and angular position with respect to the horizontal surfaces to be coated. Accordingly, structure is provided for moving the dispenser housings 38, 38A vertically, or up and down relative to the vehicle body 30; side-to-side or along a transverse axis 135 perpendicular to the direction of movement of the vehicle body 30 through the booth 10; and, pivotally relative to the vehicle body 30 wherein the dispenser housing 38 is pivoted about the transverse axis. See FIG. 6.

As mentioned above, each of the support assemblies 40 and 42 mounts one end of the two individual dispenser housings 38 and 38A. In the presently preferred embodiment, each support assembly 40 and 42 comprises back-to-back vertical columns 105 and 107 which are bolted to a common base 109 and held in an upright position by an angled brace 111 extending from the floor 14 of booth 10. See FIGS. 1 and 5. Preferably, the vertical column 105 of support assembly 40 mounts one end of dispenser housing 38, and the opposite end of dispenser housing 38 is carried by the vertical column 107 of support assembly 42. Similarly, the vertical column 107 of support assembly 40 mounts one end of dispenser housing 38A and the vertical column 105 of support assembly 42 mounts the opposite end of dispenser housing 38A. Each of the vertical columns 105 include structure for pivoting one of the dispenser housings 38, 38A, and the vertical columns 107 each include structure for moving one of the dispenser housings 38, 38A in a side-to-side direction. All vertical columns 105, 107 have the same structure to effect vertical movement of the dispenser housings 38, 38A. For purposes of the present discussion and ease of illustration, FIGS. 5-8 include details of the vertical column 105 associated with support assembly 40 and of vertical column 107 associated with support assembly 42, which are employed to move dispenser housing 38. It should be understood that the other vertical columns 105, 107 for moving dispenser housing 38A are identical in structure and function.

With respect to vertical movement of the dispenser housing 38, each of the vertical columns 105 and 107 mount a 108 which is vertically movable along a 110 and 112, such as manufactured by Nook, mounted to vertical columns 105, 107. A threaded ball screw 114 extends along the length of each vertical column 105, 107 which is rotatably carried at opposite ends by bearings 116 (the lower one only being shown). Each carriage 108 includes a pair of brackets 119, 121 which engage the linear ways 110, 112 and mount a ball nut 118 in mating engagement with the threaded ball screw 114 such that rotation of the ball screw 114 causes the nut 118, and, in turn, the carriage 108, to move vertically along the linear ways 110, 112 of support column 40 or 42.

Rotation of each ball screw 114 is obtained by a drive structure illustrated at the bottom of FIG. 1. A motor 120 is drivingly connected to a gear reducer 122 whose output is connected to a first drive shaft 124 and a second drive shaft 126. The opposite end of each drive shaft 124, 126 is connected to a 90° bevel gear 128 connected to an unthreaded extension 130 of the ball screw 114 of each vertical column 105 and 107. In response to operation of motor 120, the ball screw 114 associated with each support column 105 and 107 are rotated in either the clockwise or counterclockwise direction to move the carriages 108 vertically upwardly or downwardly along the linear ways 110, 112 with respect to the vertical columns 105 107. Preferably, one end of a cable 129 is attached to the top of carriage 108, and the cable 129 extends over a pulley 131 mounted at the top of each vertical column 105 and 107. The opposite end of cable 129 is attached to a counterweight 133 movable along the vertical columns 105, 107 which assists the above-described drive structure in moving the carriages 108 vertically upward along the vertical columns 105, 107.

With reference to the lefthand side of FIG. 6, the structure associated with the vertical column 105 of support assembly 40 is illustrated. This structure is effective to rotate or pivot the dispenser housing 38 about a transverse axis 135 which is perpendicular to the direction of movement of a vehicle body 30 through the booth 10. In the presently preferred embodiment, a cylindrical tube 132 is mounted to the brackets 119, 121 of carriage 108 associated with support assembly 40. Bearings 136 are mounted within the interior of the tube 132 at each end, and these bearings 136 rotatably carry a hollow support rod 138 having an inner end 140 connected to the dispenser housing 38. As illustrated in phantom in FIGS. 3 and 6, the utilities for the dispensers 36 carried by dispenser housing 38, e.g., the powder and electrical supply lines, extend through the hollow interior of support rod 138, into the service cavity 90 of dispenser housing 38 and then to the individual dispensers 36 as described above. This construction effectively isolates such utility lines from the spray chamber 24 of booth 10.

The opposite or outer end 142 of support rod 138 is splined and thus forms a splined connection with a timing pulley 146 which is rotated by a timing belt 148 extending between the timing pulley 146 and a second timing pulley 150 carried by the output shaft 152 of a motor 154. The motor 154 is supported on the carriage 108 by a bracket 156. Operation of the motor 154 is effective to rotate the timing pulley 146, and hence the support rod 138, so that the dispenser housing 38 and dispensers 36 carried thereon are pivoted about the transverse axis 135 to the desired angular position with respect of the horizontal surfaces of the vehicle body 30.

Referring now to the righthand portion of FIG. 6, and to FIGS. 7 and 8, structure associated with the vertical column 107 is illustrated for moving the dispenser housing 38 side-to-side, i.e., parallel to the transverse axis 135.

The carriage 108 associated with vertical column 107 mounts a hollow tube 158 by brackets 119, 121 in the same manner as described above in connection with the tube 132 of vertical column 105. The carriage 108 also mounts a bracket 160 which carries a motor 162 drivingly connected to a gear reducer 164. The output shaft 166 of gear reducer 164, in turn, is drivingly connected by an eccentric 168 to one end of a crank arm 170. The opposite end of crank arm 170 is connected by a stub shaft 172 to a rod 174 slidably received within a cylinder 176 fixedly mounted to the external wall of tube 158, the cylinder 176 being parallel to the tube 158.

A portion of the rod 174 is formed with gear teeth 178 which mesh with the teeth 180 formed on one end of a rod 182 whose axis being normal to the axis of tube 158. The opposite end of rod 182 is journaled at 184 in a bracket 186 fixedly mounted to the wall of tube 158. See FIG. 8. The rod 182 mounts a gear 188 having teeth which mesh with annular grooves 190 formed in the outer surface of a cylindrical, hollow support rod 191 carried by bearings 192, 194 within the interior of the tube 158. The inner end 196 of rod 191 mounts the opposite or righthand end of dispenser housing 38 as viewed in FIG. 6, so that the dispenser housing 38 is supported at opposite ends in position above the vehicle body 30 moving through booth 10.

Side-to-side movement of the dispenser housing 38 is obtained with the above-described structure as follows. In response to operation of motor 162, the gear reducer 164, shaft 166 and eccentric 168, the crank arm 170 is moved in an eccentric path which resembles the motion of a crank arm employed to drive the wheels of a locomotive. See solid and phantom lines in FIG. 6. In turn, the rod 174 is moved by the crank arm axially in and out of the cylinder 176. This rotates the rod 182 in the clockwise and counterclockwise direction because of the connection between the gear teeth 178 of rod 174 and the teeth 180 of rod 182. Rotation of the rod 182, in turn, rotates the gear 188 carried thereon which meshes with the teeth of the annular rack 190. In response to rotational movement of the gear 188, the annular rack 190 is thus moved axially within the tube 158 in a side-to-side direction, i.e., along the transverse axis 135 perpendicular to the direction of movement of the vehicle bodies 30 through the booth 10. Such side-to-side movement of the annular rack 190 moves the support rod 191 and attached dispenser housing 38 side-to-side, and the support tube 138 connected to the opposite end of dispenser housing 38 is slidable within bearings 136 to permit such movement. Additionally, the splined connection at the outer end 142 of support tube 138 permits slidinq movement of the support tube 138 relative to the timing pulley 146 without disrupting the rotatable connection therebetween as described above.

In the presently preferred embodiment, each of the aforementioned movements of dispenser housing 38 are obtained while maintaining a seal between the spraying chamber 24 and support assemblies 40, 42. As shown in FIG. 2, the tube 158 which carries support rod 191 mounted to dispenser housing 38 extends through a movable seal 200 formed in the side wall 18. This seal 200 comprises a top curtain 202 and bottom curtain 204 which roll up within housings 206, 208, respectively at the top and bottom of side wall 16 much like window shades. The top and bottom curtains 202, 204 abut one another and sealingly engage tube 158. In response to vertical movement of tube 158, the curtains 202, 204 roll up within or extend from their respective housings 206, 208 depending upon the direction of vertical movement of tube 158. Additionally, the curtains 202, 204 are constantly urged toward one another, and into sealing engagement with tube 158, so that a seal is maintained with tube 158 during pivotal and side-to-side movement thereof. Each of the tubes 132 and 158 associated with the vertical columns 105 and 107 of support assemblies 40, 42 is provided with a seal 200.

While the invention has been described with reference to a preferred embodiment, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

For example, in the illustrated embodiment, two dispenser housings 38 and 38A are employed to apply powder coating material onto the horizontally oriented surfaces of a vehicle body 30. It should be understood that essentially any number of dispenser housings 38 could be employed, each mounting a desired number of dispensers 36, and that the location of such dispenser housings 38, 38A need not necessarily be confined to the overhead area of booth 10. It is contemplated that the aerodynamic shape of dispenser housings 38, 38A would be useful at other locations within booth 10.

Therefore, it is intended that the invention not be limited to the particular embodiment disclosed as the best mode contemplated for carrying out this invention, but that the invention will include all embodiments falling within the scope of the appended claims.

We claim:

1. Apparatus for applying coating material onto objects, comprising:
    a spray booth having an interior which provides a controlled area for the application of coating material onto objects moving therethrough;
    means for creating a flow of air through said interior of said spray booth within which oversprayed coating material is entrained for collection;
    a dispenser housing having an outer surface formed within a leading edge, a trailing edge and side walls extending between said leading and trailing edges;
    means for mounting said dispenser housing within said interior of said spray booth so that said leading edge is first to contact the flow of air therethrough, said outer surface of said housing promoting substantially laminar air flow adjacent to and below said housing; and
    means for mounting at least one coating dispenser to said trailing edge of said dispenser housing in a position to apply coating material onto objects moving through said interior of said spray booth.

2. The apparatus of claim 1 in which said side walls of said housing are each formed in a generally convexly curved shape along at least a portion of the length thereof.

3. The apparatus of claim 1 in which said housing comprises:
    a plurality of longitudinally spaced ribs;
    first and second longitudinally extending spars which are spaced from one another;
    means for interconnecting said first and second spars and for supporting said ribs;
    an outer skin connected to said ribs.

4. The apparatus of claim 3 in which said at least one coating dispenser comprises:
    a dispenser body mounted to one of said first and second spars, said dispenser body being formed with a coating delivery passageway for transmitting coating material;

a nozzle mounted to said dispenser body in communication with said coating delivery passageway;

means carried by said dispenser body for electrostatically charging coating material discharged from said nozzle.

5. The apparatus of claim 4 wherein said means for electrostatically charging the coating material comprises:

an electrode assembly carried by the dispenser body in a position proximate a discharge outlet of the nozzle; and a dielectric block carried within a bore of the dispenser body and electrically connected to the electrode assembly at one end and an electrostatic cable at the other.

6. The apparatus of claim 5 wherein said electrostatic cable is disposed within a dielectric tube extending from the bore to a mounting block; wherein the dialectric block comprises a plurality of resistors potted together; and a means for forcing the electrostatic cable into electrical contact with one of the resistors.

7. Apparatus for applying powder coating material onto objects, comprising:

a spray booth having an interior which provides a controlled area for the application of coating material onto horizontally oriented surfaces of objects moving therethrough;

means for creating a flow of air through said interior of said spray booth within which oversprayed coating material is entrained for collection;

a dispenser housing having an outer surface formed with a leading edge, a trailing edge and side walls extending between said leading and trailing edges;

means for mounting said dispenser housing within said interior of said spray booth in a position above the horizontally oriented surfaces of objects moving through said spray booth and so that said leading edge is first to contact the flow of air therethrough, said outer surface of said housing promoting substantially laminar air flow adjacent to and below said housing; and means for mounting at least one coating dispenser to said trailing edge of said dispenser housing in a position to apply powder coating material downwardly onto the horizontally oriented surface of objects moving through said interior of said spray booth.

* * * * *

UNITED STATES PATENT AND TRADEMARK OFFICE
CERTIFICATE OF CORRECTION

PATENT NO.    : 5,275,659
DATED         : January 4, 1994
INVENTOR(S)   : Jeffrey R. Shutic et al It is certified that error appears in the above-indentified patent and that said Letters Patent is hereby corrected as shown below:

Column 5, line 63, after "powder" delete "A".

Column 7, line 58, before "108" insert -- carriage --.

Column 7, line 58, before "110" insert -- pair of linear ways --.

Column 10, line 39, delete "within" and insert -- with --.

Signed and Sealed this

Twenty-fourth Day of October, 1995

Attest:

BRUCE LEHMAN

*Attesting Officer*  *Commissioner of Patents and Trademarks*